(12) United States Patent
Oliver et al.

(10) Patent No.: US 8,984,071 B1
(45) Date of Patent: Mar. 17, 2015

(54) SYSTEMS AND METHODS FOR PROVIDING A CONTEXTUAL MESSAGE FOR A WEB-BASED SERVICE

(75) Inventors: Ian Oliver, Manly Vale (AU); Subhash Gaonkar, Wentworthville (AU)

(73) Assignee: Symantec Corporation, Mountain View, CA (US)

( * ) Notice: Subject to any disclaimer, the term of this patent is extended or adjusted under 35 U.S.C. 154(b) by 257 days.

(21) Appl. No.: 13/073,698

(22) Filed: Mar. 28, 2011

(51) Int. Cl.
*G06F 15/16* (2006.01)

(52) U.S. Cl.
USPC .......................................... 709/206

(58) Field of Classification Search
CPC ..... H04W 12/08; H04W 36/12; H04W 76/02; H04W 88/16; H04W 12/02; H04W 4/26; H04W 4/001; H04W 4/20; H04W 24/00; H04W 4/003; H04W 4/24; H04W 52/0216; H04W 88/02; H04W 88/08; H04W 88/18; H04W 8/18; H04L 63/08; H04L 63/0892; H04L 63/104; H04L 29/06047; H04L 41/00; H04L 45/22; H04L 45/308; H04L 61/1547; H04L 61/2503; H04L 2463/102; H04L 63/0421; H04L 63/0442; H04L 63/123; H04L 63/126; H04L 63/0428; H04L 67/306; H04L 12/1859; H04L 12/5695; G06F 15/16; G06F 15/167
USPC ............................ 709/25, 206, 217; 382/175
See application file for complete search history.

(56) References Cited

U.S. PATENT DOCUMENTS

| | | | |
|---|---|---|---|
| 8,010,619 B1 * | 8/2011 | Lawler et al. | 709/217 |
| 2007/0282954 A1 * | 12/2007 | Kim et al. | 709/206 |
| 2009/0254993 A1 * | 10/2009 | Leone | 726/25 |
| 2010/0042931 A1 * | 2/2010 | Dixon et al. | 715/738 |
| 2010/0074524 A1 * | 3/2010 | Stollman | 382/175 |
| 2010/0216427 A1 * | 8/2010 | Poranen | 455/410 |
| 2010/0298047 A1 * | 11/2010 | Gemelos et al. | 463/29 |
| 2012/0208568 A1 * | 8/2012 | Cooley | 455/466 |

* cited by examiner

*Primary Examiner* — Chi H Pham
*Assistant Examiner* — Raul Rivas
(74) *Attorney, Agent, or Firm* — Holland & Hart, LLP (57) ABSTRACT

A computer-implemented method to provide a contextual message for a web-based service is described. An application executing on a computing device is monitored. A link between the application and a mobile telephone number is detected. Reputation information for a service provided by the application is determined. A first informational message regarding the service is generated based on the reputation information. The first informational message is displayed.

17 Claims, 7 Drawing Sheets

SYSTEMS AND METHODS FOR PROVIDING A CONTEXTUAL MESSAGE FOR A WEB-BASED SERVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand an increase in the efficiency of these technologies. Improving the efficiency of computer technologies is always desirable to anyone who uses and relies on computers.

In some cases, users may use a computer to purchase or gain access to a web-based service. The service may advertise certain information, products, or content. Often times, the user may be required to provide a mobile telephone number in order to gain access to or purchase the service. A confirmation message may then be sent to the user verifying the user's desire to purchase or gain access to the service. Entities that provide these services may attempt to confuse the user in order to maximize their profits. When a user purchases a service, he/she may not fully understand or appreciate the contractual obligations associated with the purchase of the service. As a result, benefits may be realized by providing systems and methods for providing contextual messages for web-based services.

SUMMARY

According to at least one embodiment, a computer-implemented method to provide a contextual message for a web-based service is described. An application executing on a computing device is monitored. A link between the application and a mobile telephone number is detected. Reputation information for a service provided by the application is determined. A first informational message regarding the service is generated based on the reputation information. The first informational message is displayed.

In one embodiment, the service provided by the application may be scanned for subscription information. The subscription information may include an end user licensing agreement. In one example, the subscription information may be analyzed to determine reputation information for the service. The subscription information may also include pricing information relating to the service.

In one configuration, an incoming message addressed to the mobile telephone number may be intercepted. The incoming message may be a short message service (SMS) text message originating from the service. The incoming message and information associated with the service that originated the incoming message may be analyzed. In one example, a second informational message regarding the service that originated the incoming message may be generated.

A computing device configured to provide a contextual message for a web-based service is also described. The device may include a processor and memory in electronic communication with the processor. The device may also include a monitoring module configured to monitor an application executing on a computing device, and detect a link between the application and a mobile telephone number. The monitoring module may also be configured to determine reputation information for a service provided by the application, and generate a first informational message regarding the service based on the reputation information. In addition, the monitoring module may be configured to display the first informational message.

A computer-program product for providing a contextual message for a web-based service is also described. The computer-program product may include a non-transitory computer-readable medium having instructions thereon. The instructions may include code programmed to monitor an application executing on a computing device, and code programmed to detect a link between the application and a mobile telephone number. The instructions may further include code programmed to determine reputation information for a service provided by the application, and code programmed to generate a first informational message regarding the service based on the reputation information. Further, the instructions may include code programmed to display the first informational message.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Creators of malware are continuously seeking for ways to deceive users of computers to make money. Some of these techniques may be technically legal, but may still be considered a scam that may confuse a user. Many users often sign up for a service via a website without fully understanding the initial and recurring costs of the service. A user may also not fully understand the value of the content associated with the service. For example, a user may sign up to be in a contest that selects a winner in one year and awards the selected winner $1,000. In the meantime, however, the user may be committing to pay a subscription fee for this service during that year that totals $500. As a result, users that sign up for this service may be confused and not fully understand the subscription costs associated with being entered into the contest.

In some cases, a user may sign up for a service by providing a mobile telephone number on a website. The users may then receive a confirmation message via email, short message service (SMS) text, and the like on a mobile communications device associated with the mobile telephone number provided by the user. The present systems and methods may provide multiple points of warning for a user that signs up for a service by providing a mobile telephone number via an application, website, and the like. In one embodiment, an initial warning may be provided to the user when the user enters his/her mobile number in an application, a website, etc. A second warning may be provided to the user when the user receives a confirmation message (e.g. SMS text, email, etc.). These multiple warnings may provide additional information to the user to assist the user fully understand the terms and value of the service being requested. Details regarding the present systems and methods will be described below.

Figure 1:
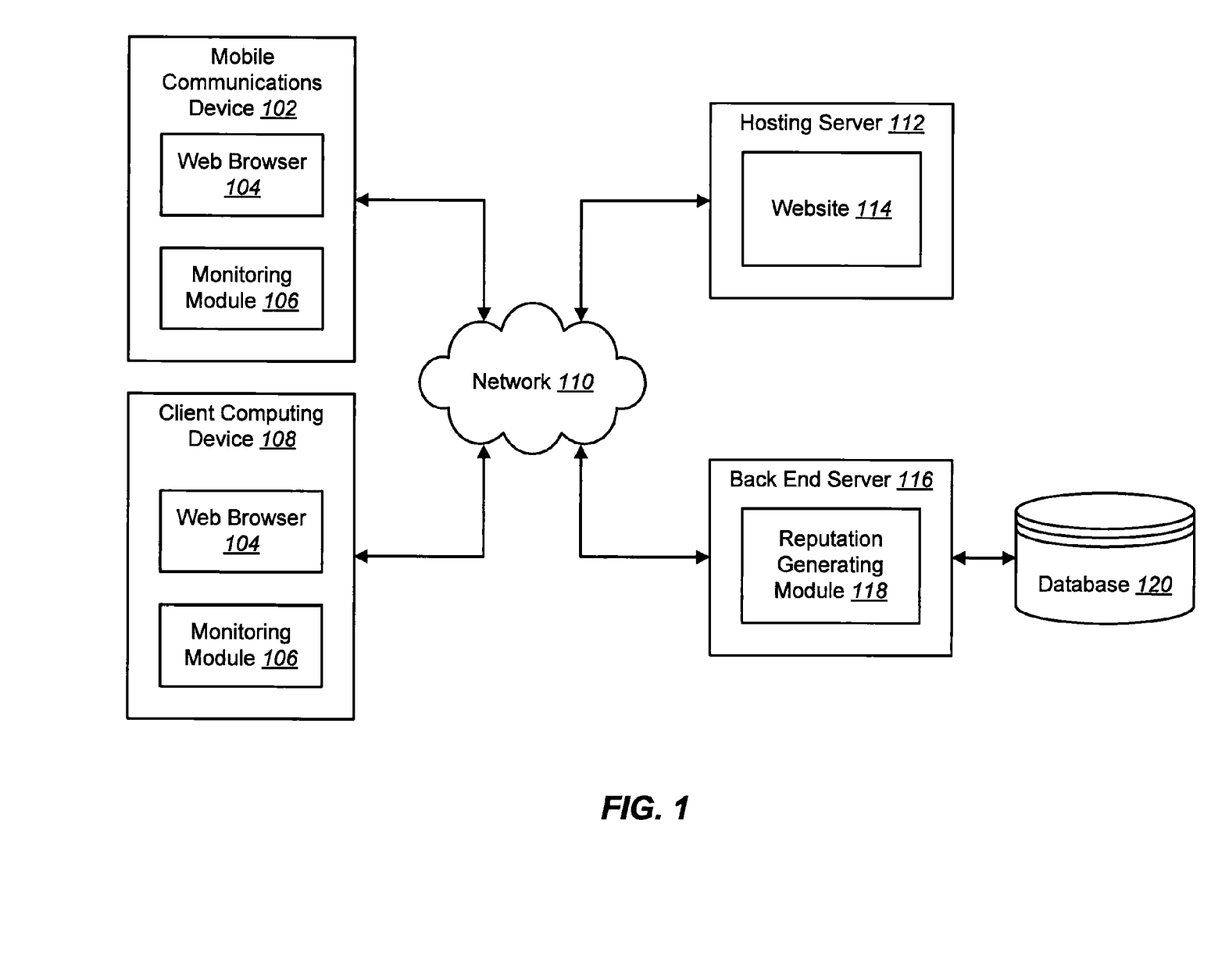
FIG. 1 is a block diagram illustrating one embodiment of an environment in which the present systems and methods may be implemented.

FIG. 1 is a block diagram illustrating one embodiment of an environment in which the present systems and methods may be implemented. In one configuration, a mobile communications device 102 and a client computing device 108 may communicate with a hosting server 112 and a back end server 116 over a network connection 110. In one example, the mobile communications device 102 may be, but is not limited to, a cellular phone, a smartphone, or any other type of mobile communications device. The client computing device 108 may be, but is not limited to, a personal computer (PC), a server, a laptop, a personal digital assistant (PDA), or any other type of computing device.

In one embodiment, the mobile communications device 102 and the client computing device 108 may include a web browser 104 and a monitoring module 106. The web browser 104 may be used to access and display a website 114 hosted by the hosting server 112. The hosting server 112 may also host an application that may be installed or executed on the mobile communications device 102 and the client computing device 108.

The website 114 (or application) may offer a service or other type of information to a user. The monitoring module 106 may monitor for certain data entered by the user to the website 114. The monitoring module 106 may analyze certain characteristics of the website 114 when the entered data is detected. In one embodiment, the monitoring module 106 may provide at least one warning message to the user based on the analysis of the website 114 (or application) that received the entered data. In addition, the monitoring module 106 may monitor the mobile communications device 102 for incoming messages, such as, but not limited to, SMS texts, emails, and the like. In one configuration, the incoming messages may be confirmation messages relating to the service provided by the website 114, application, and the like. The monitoring module 106 may analyze the incoming messages and provide an additional warning message to the user regarding the service provided by the website 114.

In one configuration, the back end server 116 may include a reputation generating module 118. The reputation generating module 118 may receive information regarding the website 114, application, etc. that requests and receives data from a user. The module 118 may generate reputation data for the website 114 or application based on the received information. The reputation data may be stored in a database 120 associated with the back end server 120.

Figure 2:
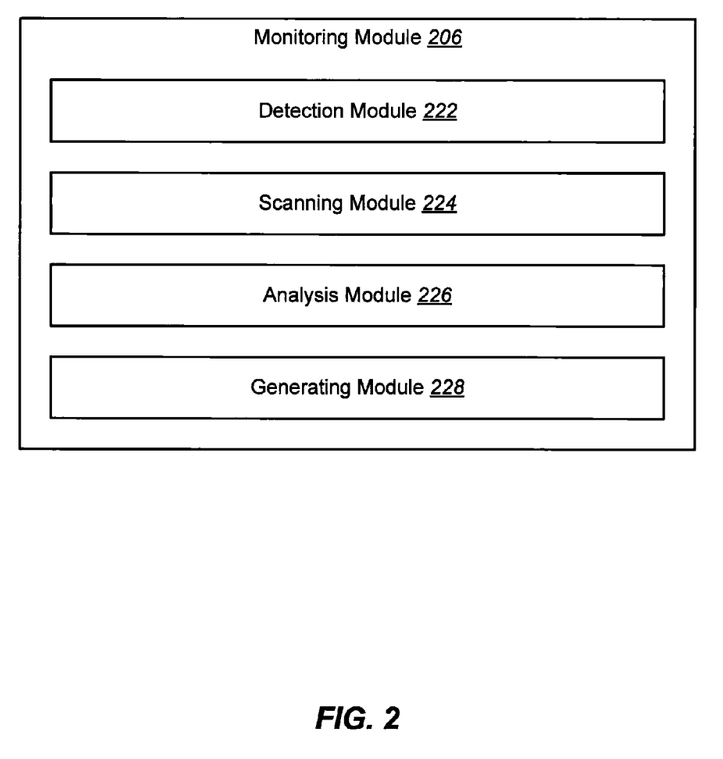
FIG. 2 is a block diagram illustrating one embodiment of a monitoring module in accordance with the present systems and methods.

FIG. 2 is a block diagram illustrating one embodiment of a monitoring module 206 in accordance with the present systems and methods. In one configuration, the monitoring module 206 may include a detection module 222, a scanning module 224, an analysis module 226, and a generating module 228. The detection module 222 may detect the input of certain data to a website 114 or application displayed on the mobile communications device 102 or the client computing device 108. In one example, the detection module 222 may detect when a telephone number is entered into data fields of the website 114 or another type of application. In one configuration, the telephone number may correspond to the mobile communications device 102.

In one example, the scanning module 224 may scan information associated with the website 114 or application that received the data (such as the mobile telephone number) inputted by the user. In one configuration, the scanning module 224 may scan the website 114 or application to locate subscriber information. An example of subscriber information may include an end user licensing agreement (eula). The scanning module 224 may scan the eula to locate information relating to terms of a subscription. For example, the scanning module 224 may scan the eula to locate pricing information, a telephone number associated with the service provided by the website 114 or application, contact information of the entity providing the service, and the like. The analysis module 226 may analyze the information detected by the scanning module 226. The analysis module 226 may determine a reputation of the service provided by the website 114 or application based on the scanned information. In addition, the analysis module 226 may access reputation information stored in the database 120 for the desired service. In one example, the reputation information may be provided by users that have previously used the service provided on the website 114 or application. In one configuration, the analysis module 226 may analyze characteristics of the service (e.g., key words, subscription costs, associated websites, etc.) to determine the reputation of the service.

Based on the analysis, the generating module 228 may generate a message to provide to the user. The message may be a message warning the user that the website 114 or application providing the desired service does not have a favorable reputation. For example, the service may offer to provide the user with his/her IQ score via a text message. The generating module 228 may generate a warning message to the user indicating that these types of services may not provide accurate results and that the value of this service may not be worth the required price. In addition, the message may include information regarding the cost of using the service should the user go forward and purchase the service provided by the website 114 or application. For example, the generating module 228 may generate a warning message to the user that provides the overall cost of subscribing to the service and the relative value of the service being provided.

Figure 3:
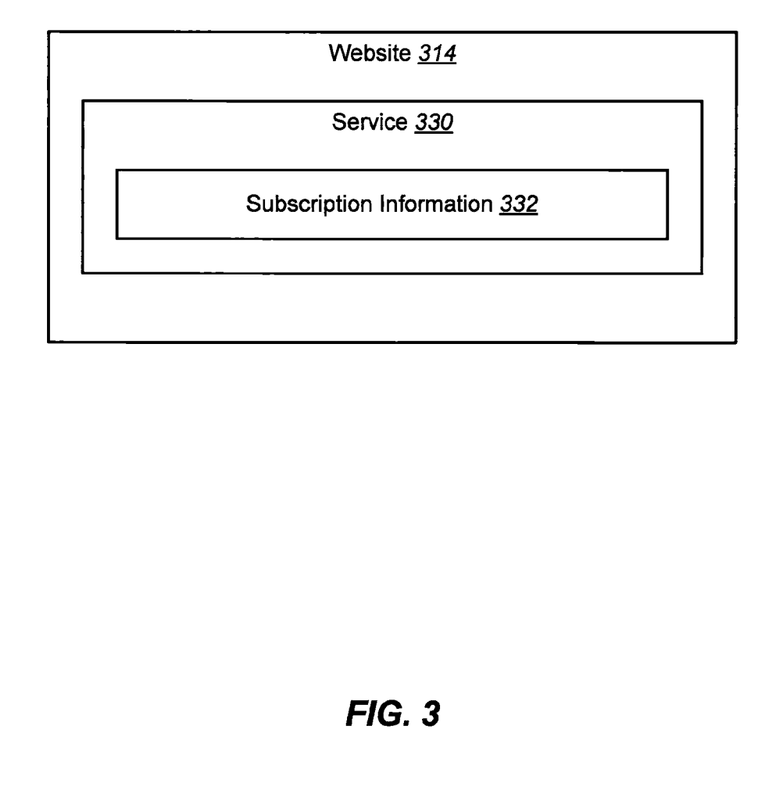
FIG. 3 is a block diagram illustrating one embodiment of a website that may provide a service.

FIG. 3 is a block diagram illustrating one embodiment of a website 314 that may include or provide a service 330. In addition to the website 314, the service 330 may be provided via an application installed on the mobile communications device 102 and the client computing device 108. In one configuration, the service 330 may include subscription information 332. The subscription information 332 may include contractual information for the user desiring to use the service 330. For example, the website 314 may include a service 330 that offers to send a user his/her IQ score via a SMS text message. The website 314 may include data fields where the user may enter his/her mobile telephone number. The subscription information 332 may be a eula that includes the contractual information for the user. For example, the eula may indicate that by requesting the service 330, the user will receive a monthly SMS text message from the service 330 with his/her IQ score for $10/month. The eula may also indicate that the user will remain subscribed to the service 330 until the user sends a request (via email or phone) to cancel the subscription. After the user has initially requested the service 330 (e.g., by entering a mobile telephone number on the website 314), the service 330 may also transmit a SMS text message to the provided mobile telephone number. The SMS text message may be a confirmation message addressed to the user. The user may be requested to respond to the SMS text message or take some other action to confirm the desired subscription to the service 330.

Figure 4:
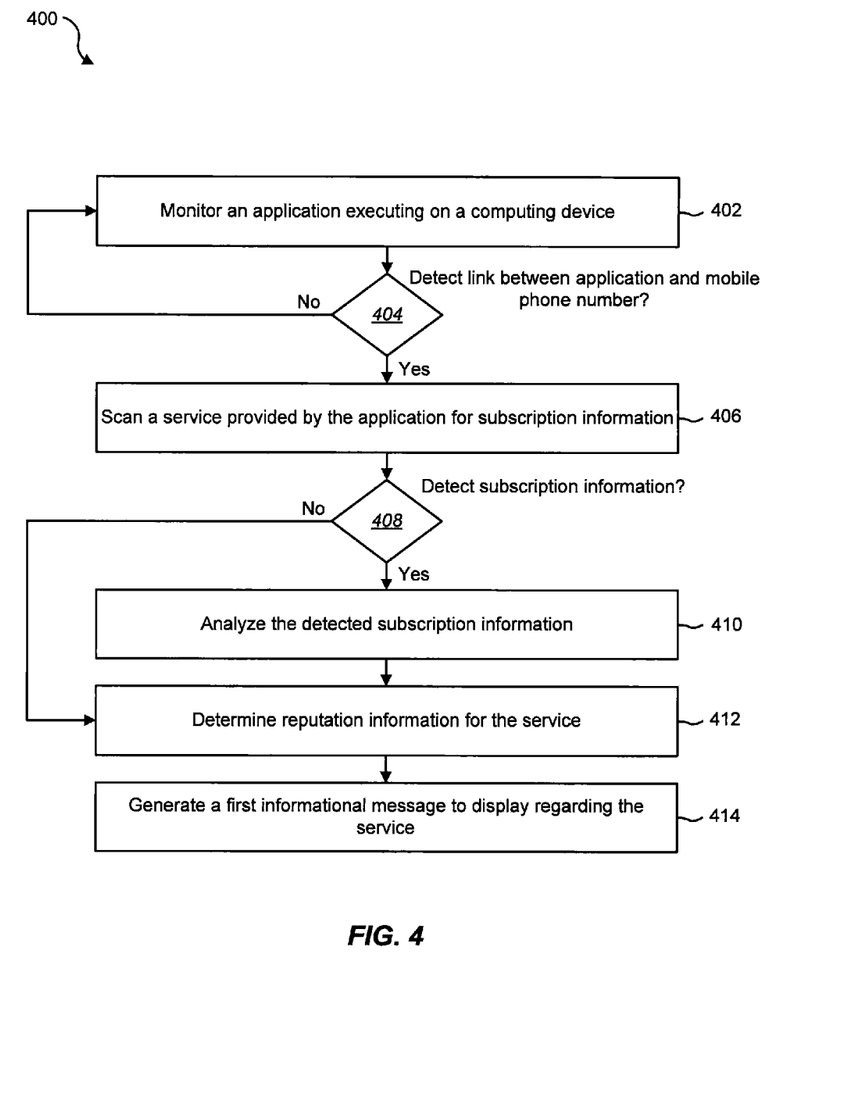
FIG. 4 is a flow diagram illustrating one embodiment of a method to provide a contextual warning for web-based services.

FIG. 4 is a flow diagram illustrating one embodiment of a method 400 to provide a contextual warning for web-based services. In one configuration, the method 400 may be implemented by the monitoring module 106.

In one embodiment, an application executing on a computing device may be monitored 402. The application may be a web browser 104 or any other type of application. The computing device may be a computer, mobile communications device, etc. In one configuration, the application may include a service being offered to a user of the application. A determination 404 may be made as to whether a link is detected between the application and a mobile phone number. For example, the application may include data fields a request for the user to enter his/her mobile number into the data fields. In one configuration, the user may access the application via a mobile communications device. By accessing the application via the mobile communications device, a link may be established between the application the device. If it is determined 404 that a link has not been established between the application and the mobile phone number, the method 400 may return to monitor 402 the application. If, however, it is determined 404 that a link has been detected between the application and a mobile phone number, the service provided by the application may be scanned 406 for subscription information. For example, the service may be scanned for an eula associated with the service.

In one example, a determination 408 may be made as to whether subscription information associated with the service is detected 408. If it is determined 408 that subscription information is detected with the service, the detected subscription information may be analyzed 410. For example, the subscription information may be analyzed to determine pricing information associated with the service, contact information associated with an entity providing the service, subscription requirements associated with the use of the service, and the like.

If, however, it is determined 408 that subscription information has not been detected or after the subscription information has been analyzed, reputation information for the service may be determined 412. If subscription information has been detected and analyzed, the analyzed information may be used to determine 412 the reputation information for the service. For example, the reputation information may be determined from an analysis of the type of service being offered and the terms provided in the detected subscription information. If subscription information has not been detected, the reputation information for the service may be determined 412 by analyzing the history of websites that were previously accessed before the website that includes the desired service. The reputation for each website included in the history of websites may be determined and a reputation for the service may be determined based on the reputations of the websites included in the history of websites. In addition, the reputation information may be determined 412 by accessing the database 120. In one configuration, users that have previously accessed the service may provide feedback that may be used to determine reputation information for the service. In addition, if previously users have declined the service being offered, this type of feedback information may also be used to generate reputation information for the service. The reputation information may then be stored in the database 120 and accessed at a later time. Further, the reputation information may be determined 412 by analyzing the type of service being offered. For example, the service may offer information to the user that has a high probability of being inaccurate (e.g., an IQ score). As a result, the reputation information for this particular service may relatively low.

In one embodiment, a first informational message may be generated 414 regarding the service. The message may include the reputation information for the service as well as a recommendation as to whether the user should continue to purchase or otherwise use the service. The message may be displayed to the user via a display included on the mobile communications device 102 and the client computing device 108. In one configuration, the message may include details regarding the terms of the subscription associated with the use of the service. For example, the message may provide the costs associated with the use of the service.

Figure 5:
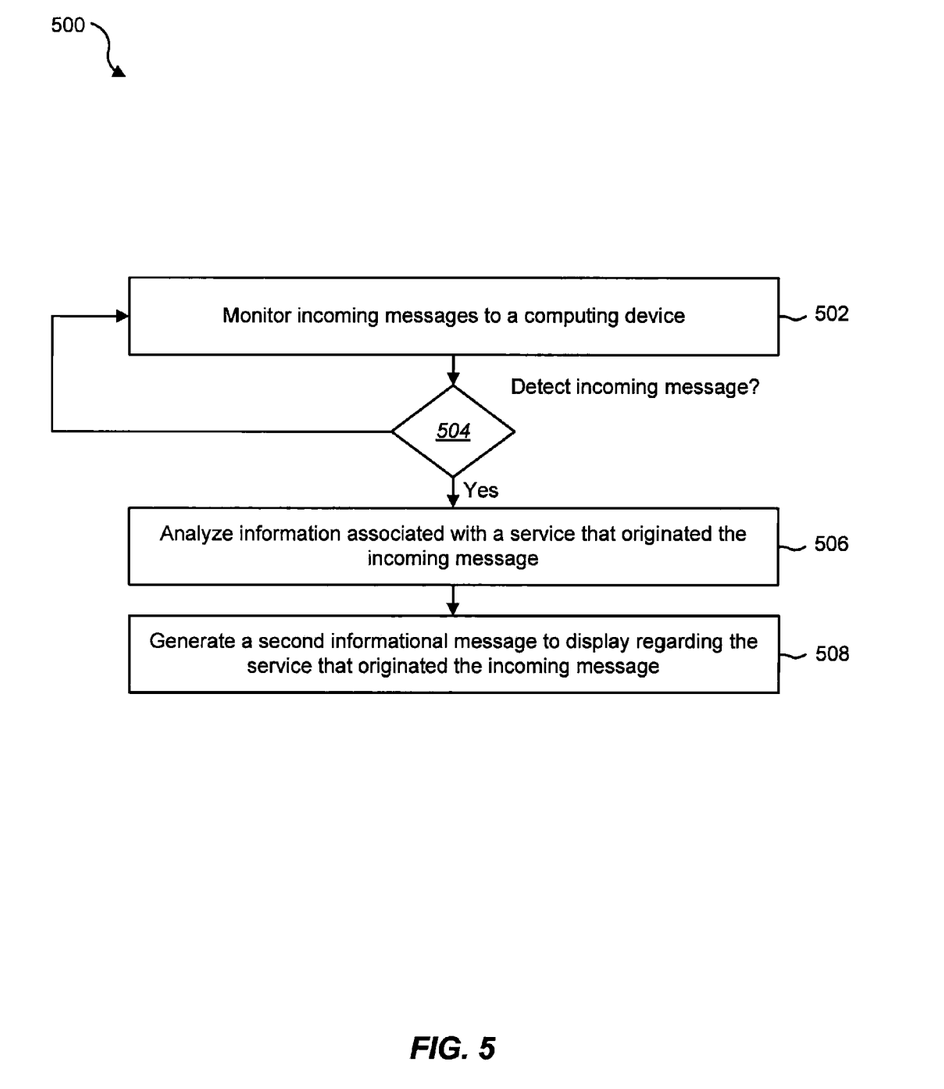
FIG. 5 is a flow diagram illustrating another embodiment of a method to provide a contextual warning for web-based services.

FIG. 5 is a flow diagram illustrating another embodiment of a method 500 to provide a contextual warning for web-based services. In one example, the method 500 may be implemented by the monitoring module 106.

In one embodiment, incoming messages to a computing device may be monitored 502. In one configuration, the computing device may include the mobile communications device 102 (such as a cell phone). The incoming messages may be, but are not limited to, SMS text messages. A determination 504 may be made as to whether an incoming message has been detected. If it is determined 504 that an incoming message has not been detected, the method 500 may return to monitor 502 for incoming messages to a computing device.

If, however, it is determined 504 that an incoming message is detected, information associated with a service that originated the incoming message may be analyzed 506. For example, the incoming message may include information relating to a service previously accessed or viewed by a user. The user may have previously provided a mobile telephone number to the service. The information in the incoming message may be similar to the information previously provided to the user about the service. For example, the service previously presented to the user may have included a description of the service, contact information for the entity providing the service, and the like. The incoming message may also include similar information and request that the user confirm his/her desire to access the service. In one embodiment, the information included in the incoming message may be different that the information previously presented to the user regarding the service. For example, the user may view information regarding a first service and provide a mobile telephone number to gain access to the service. The user may receive a SMS text message at the provided mobile telephone number. The SMS text message, however, may include information for a service that is different that the service desired by the user.

In one configuration, a second informational message may be generated 508 regarding the service that originated the incoming message. The second informational message may also provide reputation information regarding the service. If the incoming message includes information for a service that is different that the service originally desired by the user, the second informational message may indicate this discrepancy to the user.

As explained above, according to the present systems and methods, when a user enters their mobile number in a website to gain access to a service, if subscription information (such as pricing) can be obtained for the service, the user may be warned after entering the mobile number. In one embodiment, when an SMS message is received on the mobile phone corresponding to the entered number, the user may be warned again at the critical stage before the user confirms the sign up process to access the service. The message may warn the user that the SMS (or email) message originated from the previous context. The message may also warn the user about associated costs of the service as well as other features relating to the nature of the content to be expected from the service. In one embodiment, the initial entry of the mobile number to begin the sign up process for the service may be entered via a website accessed on the client computing device 108 or the mobile communications device 102.

The present systems and methods may provide at least two points of warning. As mentioned above, the initial warning point may be when the user enters their mobile number in a website 114. If a eula is associated with the service being offered on the website 114, the details of the eula may be extracted. In addition, any reference to a phone number that may be a premium number may also be extracted to include in the warning to the user. The number may be checked to determine whether it has been previously reported. In one embodiment, when the mobile number is entered, the eula may be checked and a warning message may be generated based on a finding of costs associated with the service or other information that is important for the user to know before making a decision as to whether the user should continue to request access to the service. The mobile number may be initially entered in a website 114 displayed on the client computing device 108 or the mobile communications device 102.

In one embodiment, when an SMS is later received in relation to the entry of the mobile number, the context of the service and the information previously extracted (e.g., cost, content, etc.) may be redisplayed in a second information message so that the SMS may be connected to the original context. The connection between these two events (i.e., the initial entry and the SMS message) may be information such as, but not limited to, a company name, a phone number, the name of the service being offered, a description of the service, and the like.

In one configuration, the information presented to the user as well as the website 114 or application from where it came may be sent to the back end server 116 for aggregation. Based on this aggregated information, priority websites may have analysts perform analysis and contribute to the reputation information assigned to the websites. Users who have viewed the website 114 or have experienced the service being offered on the website 114 may also contribute to reputation information for the service. In one example, the phone number and information about the service may also be stored in the database 120.

In one embodiment, when a user declines the service after viewing the information provided in the first or second information messages, this may also be sent to the back end server 116 for aggregation for determining reputation information. The user may be enabled to provide a reason for declining the service.

In addition to the eula, as previously explained, a previous chain of website content may be used to determine the reputation of the website 114 and service offered on the website 114. The reputation information may inform the user whether a particular service has a low value offering. This may help to user may an informed decision about the nature of charges and other user experiences that may occur after accepting the SMS confirmation message to purchase or use the service. In one example, if the number of SMS messages or emails received from the service exceeds a certain threshold, the informational messages may warn the user of the spamming nature of the website 114 that is offering the service. The present systems and methods may be adjusted or configured depending on the local regulations and laws governing the offer of such web-based services.

In one embodiment, the present systems and methods may also provide a parental control aspect. For example, a setting within the monitoring module 106 may be made so that if the user logged into the communications device 102 or the computing device 108 is younger than a particular age (e.g., 18 years of age), and the content of the website 114 or the service offered on the website 114 requires confirmation that the user is an adult, a form of action may be taken. Similarly, if the content described in the subscription information, such as the eula, or the content of the chain of websites suggest adult consent is required, a form of action may be taken.

In one configuration, when the website 114 and service offered on the website are determined to have a high suspicion score (e.g., low reputation), they may be rated permanently. In addition, phone numbers associated with this website 114 and service may also receive a permanent rating, which may be stored in the database 120. In one example, users may be warned of that expenses associated with the service may be continuous and ongoing until the user unsubscribes from the service and receives an unsubscribe message.

The present systems and methods may also statistically identify likely spammy services. These services may resend SMS messages under different names after the initial contact. The services may be identified by cross referencing across multiple users and identifying which common users share common SMS messages and from which common source sent the messages. As a result, the present systems and methods may identify the websites and services where the initial mobile entry was performed which caused the subsequent SMS spam messages.

Figure 6:
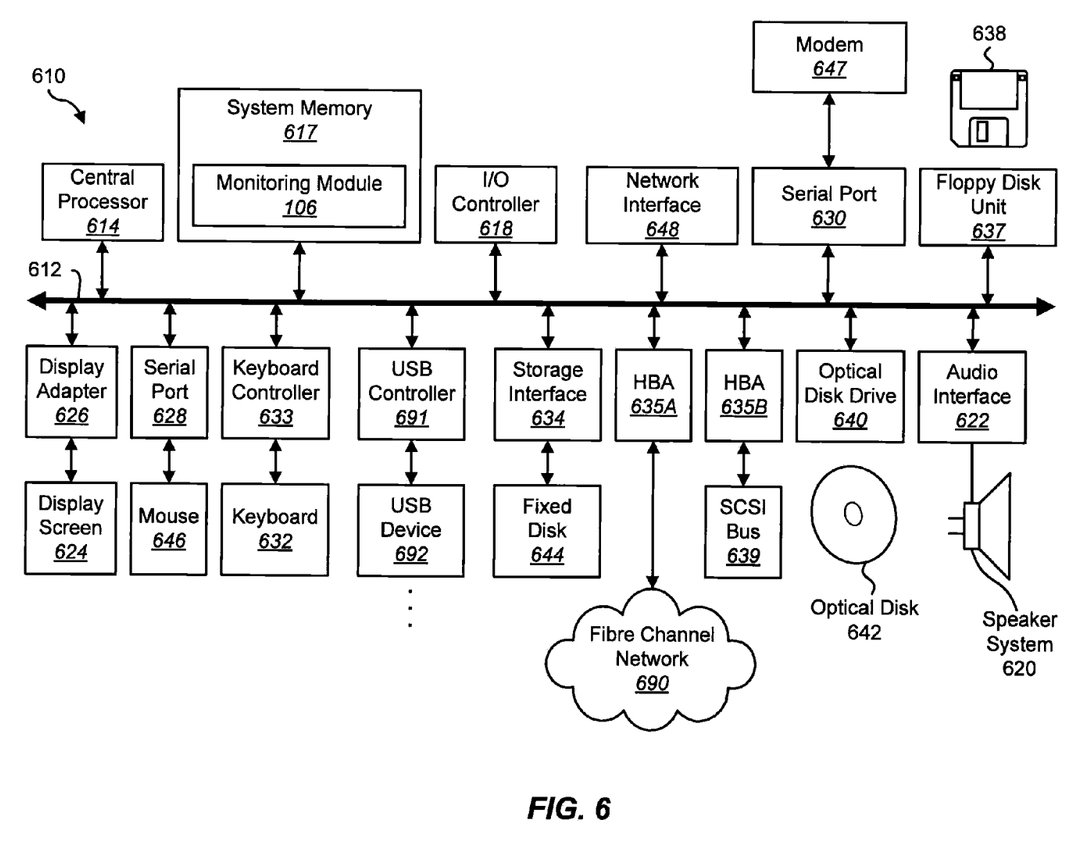
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), multiple USB devices 692 (interfaced with a USB controller 690), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the monitoring module 106 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable medium such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
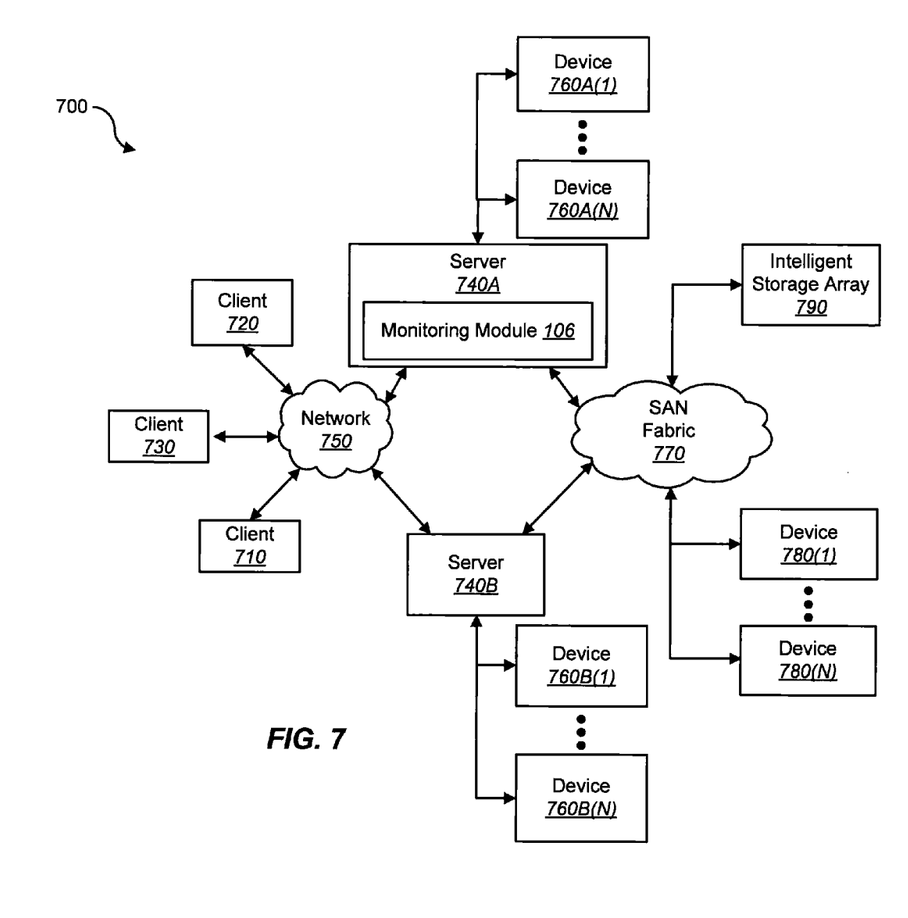
FIG. 7 is a block diagram depicting a network architecture in which client systems, as well as storage servers (any of which can be implemented using computer system), are coupled to a network.

FIG. 7 is a block diagram depicting a network architecture 700 in which client systems 710, 720 and 730, as well as storage servers 740A and 740B (any of which can be implemented using computer system 710), are coupled to a network 750. In one embodiment, the monitoring module 106 may be located within a server 740A, 740B to implement the present systems and methods. The storage server 740A is further depicted as having storage devices 760A(1)-(N) directly attached, and storage server 740B is depicted with storage devices 760B(1)-(N) directly attached. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720, and 730 to network 750. Client systems 710, 720, and 730 are able to access information on storage server 740A or 740B using, for example, a web browser or other client software (not shown). Such a client allows client systems 710, 720, and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to provide a contextual message in relation to detecting a potential scam, comprising:
    monitoring, by a processor, an application executing on a computing device;
    detecting, by the processor, the application requesting a user to enter a mobile telephone number in a data field of the application;
    identifying, by the processor, a subscription to a service associated with the application requesting the user to enter the mobile telephone number, the application being configured to subscribe the user to the service via the user submitting the mobile telephone number;
    obtaining, by the processor, information regarding the service, the information including at least one of a contractual term associated with the subscription and contact information associated with an entity providing the service;
    determining, by the processor, reputation information for the service provided by the application based on obtaining the information regarding the service;
    classifying, by the processor, the application as a potential scam based at least in part on the identified subscription and the reputation information;
    generating a first informational message regarding the service based on the reputation information; and
    displaying the first informational message.

2. The method of claim 1, wherein the subscription information comprises an end user licensing agreement.

3. The method of claim 1, further comprising analyzing the subscription information to determine reputation information for the service.

4. The method of claim 1, wherein the subscription information comprises pricing information relating to the service.

5. The method of claim 1, further comprising intercepting an incoming message addressed to the mobile telephone number.

6. The method of claim 5, wherein the incoming message comprises a short message service (SMS) text message originating from the service.

7. The method of claim 5, further comprising analyzing the incoming message and information associated with the service that originated the incoming message to identify an association between the intercepted message and the identified subscription.

8. The method of claim 7, further comprising, upon identifying the association between the intercepted message and the identified subscription, generating a second informational message regarding the service that originated the incoming message.

9. A computing device configured to provide a contextual message in relation to detecting a potential scam, comprising:
    a processor;
    memory in electronic communication with the processor;
    instructions stored in the memory, the instructions being executable by the processor to:
        monitor an application executing on a computing device;
        detect the application requesting a user to enter a mobile telephone number in a data field of the application;
        identify a subscription to a service associated with the application requesting the user to enter the mobile telephone number, the application being configured to subscribe the user to the service via the user submitting the mobile telephone number;
        obtain information regarding the service, the information including at least one of a contractual term associated with the subscription and contact information associated with an entity providing the service;
        determine reputation information for the service provided by the application based on obtaining the information regarding the service;
        classify the application as a potential scam based at least in part on the identified subscription and the reputation information;
        generate a first informational message regarding the service based on the reputation information; and
        display the first informational message.

10. The computing device of claim 9, wherein the subscription information comprises an end user licensing agreement.

11. The computing device of claim 9, wherein the instructions are executable by the processor to:
    analyze the subscription information to determine reputation information for the service.

12. The computing device of claim 9, wherein the subscription information comprises pricing information relating to the service.

13. The computing device of claim 9, wherein the instructions are executable by the processor to:
    intercept an incoming message addressed to the mobile telephone number.

14. The computing device of claim 13, wherein the incoming message comprises a short message service (SMS) text message originating from the service.

15. The computing device of claim 13, wherein the instructions are executable by the processor to:
    analyze the incoming message and information associated with the service that originated the incoming message to identify an association between the intercepted message and the identified subscription.

16. The computing device of claim 15, wherein the instructions are executable by the processor to:
    upon identifying the association between the intercepted message and the identified subscription, generate a second informational message regarding the service that originated the incoming message.

17. A computer-program product for providing a contextual message in relation to detecting a potential scam, the computer-program product comprising a non-transitory computer-readable medium storing instructions thereon, the instructions being executable by the processor to:
  monitor an application executing on a computing device;
  detect the application requesting a user to enter a mobile telephone number in a data field of the application;
  identify a subscription to a service associated with the application requesting the user to enter the mobile telephone number, the application being configured to subscribe the user to the service via the user submitting the mobile telephone number;
  obtain information regarding the service, the information including at least one of a contractual term associated with the subscription and contact information associated with an entity providing the service;
  determine reputation information for the service provided by the application based on obtaining the information regarding the service;
  classify the application as a potential scam based at least in part on the identified subscription and the reputation information;
  generate a first informational message regarding the service based on the reputation information; and
  display the first informational message.

* * * * *